United States Patent
Sakamoto et al.

(10) Patent No.: US 8,462,608 B2
(45) Date of Patent: Jun. 11, 2013

(54) READ-ONLY OPTICAL RECORDING MEDIUM

(75) Inventors: Tetsuhiro Sakamoto, Kanagawa (JP); Jun Nakano, Tokyo (JP); Takehide Endo, Kanagawa (JP); Naoki Okawa, Shizuoka (JP)

(73) Assignees: Sony Corporation, Tokyo (JP); Sony DADC Corporation, Tokyo (JP)

( * ) Notice: Subject to any disclaimer, the term of this patent is extended or adjusted under 35 U.S.C. 154(b) by 0 days.

(21) Appl. No.: 13/319,796

(22) PCT Filed: May 17, 2010

(86) PCT No.: PCT/JP2010/003313
§ 371 (c)(1),
(2), (4) Date: Nov. 10, 2011

(87) PCT Pub. No.: WO2010/137251
PCT Pub. Date: Dec. 2, 2010

(65) Prior Publication Data
US 2012/0113789 A1    May 10, 2012

(30) Foreign Application Priority Data
May 29, 2009    (JP) .................... 2009-131286

(51) Int. Cl.
*G11B 3/70*    (2006.01)
(52) U.S. Cl.
USPC ....................................... 369/288

(58) Field of Classification Search
None
See application file for complete search history.

(56) References Cited

U.S. PATENT DOCUMENTS

| | | |
|---|---|---|
| 7,177,264 B2 | 2/2007 | Aratani et al. |
| 2005/0112019 A1 | 5/2005 | Nakai et al. |
| 2008/0253271 A1 | 10/2008 | Miki et al. |
| 2009/0252914 A1 | 10/2009 | Sakamoto et al. |

FOREIGN PATENT DOCUMENTS

| | | |
|---|---|---|
| JP | 2003-317318 | 11/2003 |
| JP | 2005-158236 | 6/2005 |
| JP | 2007-092153 | 4/2007 |
| JP | 2007-335003 | 12/2007 |
| JP | 2008-10080 | 1/2008 |
| JP | 2009-076129 | 4/2009 |

OTHER PUBLICATIONS

International Search Report Dated Aug. 10, 2010.

*Primary Examiner* — Paul Huber
(74) *Attorney, Agent, or Firm* — Dentons US LLP

(57) ABSTRACT

[Object] To provide a durable read-only optical recording medium having less variances in characteristics of a metal reflective film due to a temporal change.
[Solving Means] Provided is a read-only optical recording medium (100) including: a substrate (101); an information recording surface onto which information is recorded by combining pits (P) and lands (L); and a metal reflective film (102) that is provided in contact with the information recording surface and represented by $Al_{100-x-z}X_xZ_z$, where x and z each represent an atomic %, X is constituted of an element including at least Ti, Z is constituted of an element including at least Fe, x is 1.0 to 3.0, and z is 0.05 to 1.0.

4 Claims, 12 Drawing Sheets

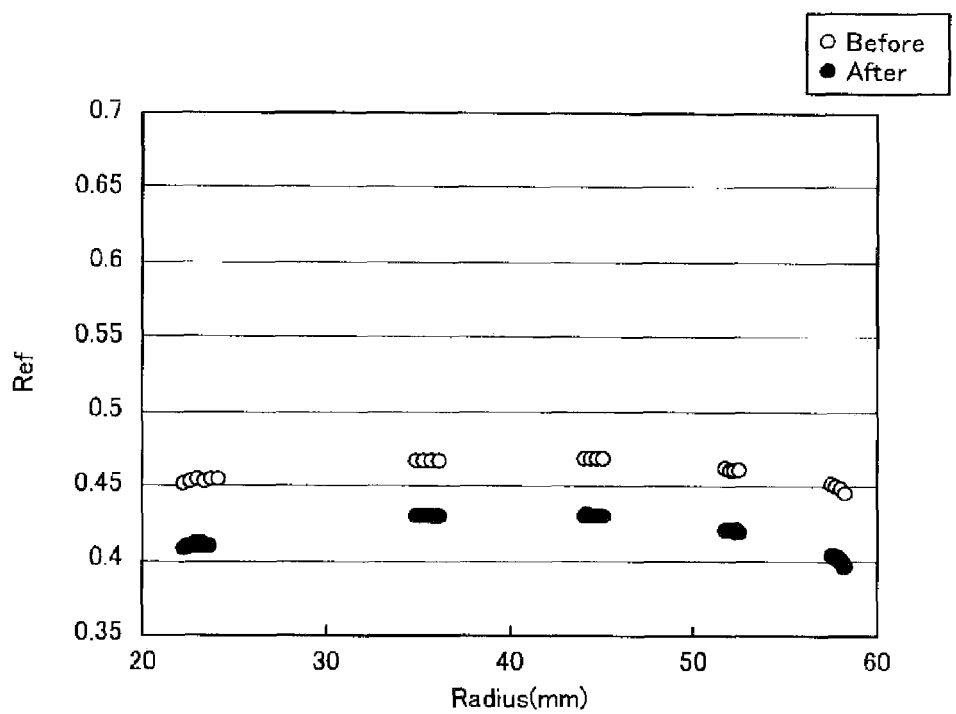
A
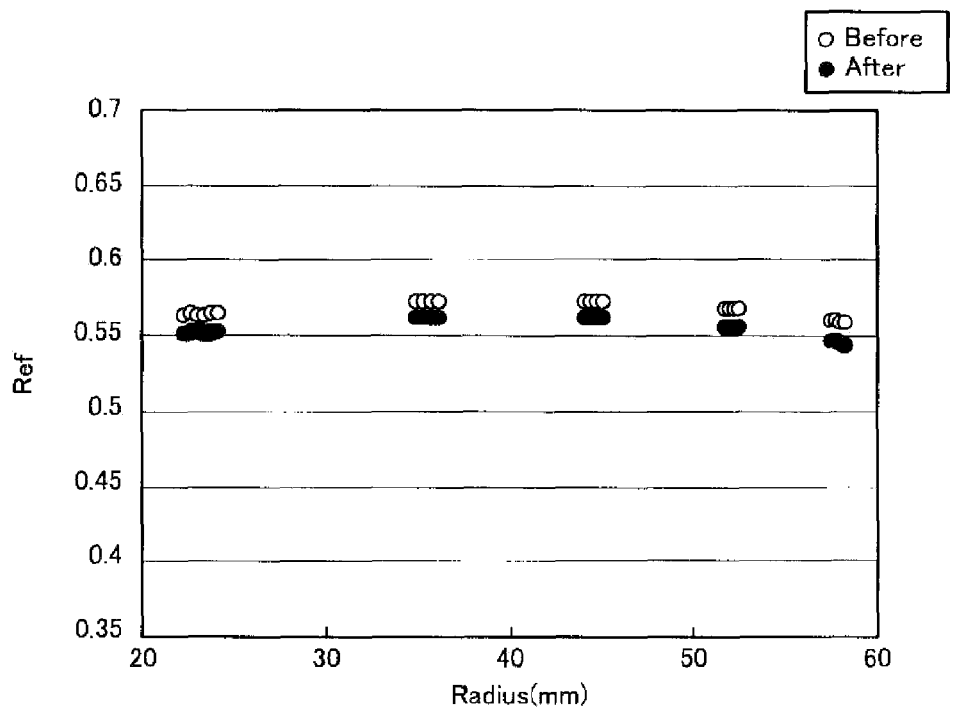
B
FIG.8

READ-ONLY OPTICAL RECORDING MEDIUM

This application is a 371 of PCT/JP2010/003313, filed May 17, 2010.

TECHNICAL FIELD

The present invention relates to a read-only optical recording medium including a metal reflective film.

BACKGROUND ART

For an optical disc, particularly a read-only ROM (Read Only Memory) disc, as an optical recording medium, a large amount of replica substrates can be produced at low costs in a short time by injection molding of plastic from a single stamper. Therefore, optical recording media are widely used as package media.

Incidentally, for preventing a copyright infringement, a method of adding identification information that differs for each disc is being considered. As the method of adding identification information, there is proposed a method of, for example, recording sub-data onto a metal reflective film (e.g., see Patent Document 1).

In an optical disc of Patent Document 1, an Ag (silver) alloy is used as the metal reflective film.

The metal reflective film formed of an Ag alloy can be used not only in a read-only optical recording medium of Patent Document 1 that records sub-data, but also in a general read-only optical recording medium.

However, since a silver alloy is somewhat expensive as a material of the read-only optical recording medium, a cost increases.

In this regard, using Al (aluminum) in place of Ag is being considered.

In actuality, Al or an Al alloy is used as a metal reflective film in an optical recording medium that records/reproduces information using light having wavelengths of 650 nm and 780 nm (see, for example, Patent Document 2).

Patent Document 1: Japanese Patent Application Laid-open No. 2007-335003
Patent Document 2: Japanese Patent Application Laid-open No. 2003-317318

DISCLOSURE OF THE INVENTION

Problems to be Solved by the Invention

However, using Al or an Al alloy that is used in the optical recording medium that records/reproduces information using light having wavelengths of 650 nm and 780 nm as in the related art for a metal reflective film constituting an optical recording medium that records/reproduces information using light having a wavelength of 405 nm causes problems.

Specifically, reflectance with respect to light having a wavelength of 405 nm is lowered by a temporal change.

Moreover, when sub-data is recorded onto and reproduced from the metal reflective film, reproduction signal outputs vary due to the temporal change.

For solving the problems described above, in the present invention, a durable read-only optical recording medium having less variances in characteristics of a metal reflective film due to a temporal change is provided.

Means for Solving the Problems

According to the present invention, there is provided a read-only optical recording medium, including: a substrate; an information recording surface that is structured by combining pits and lands formed on the substrate and onto which information is recorded; and a metal reflective film that is provided in contact with the information recording surface and represented by $Al_{100-x-z}X_xZ_z$, where x and z each represent an atomic %, X is constituted of an element including at least Ti, Z is constituted of an element including at least Fe, x is 1.0 to 3.0, and z is 0.05 to 1.0.

With the structure of the read-only optical recording medium according to the present invention, the metal reflective film is represented by $Al_{100-x-z}X_xZ_z$, where x and z each represent an atomic %, a content of the X component including at least Ti is 1.0 to 3.0, and a content of the Z component including at least Fe is 0.05 to 1.0.

Accordingly, it becomes possible to suppress variances of characteristics of the metal reflective film (e.g., reflectance with respect to light having wavelength of 405 nm) due to a temporal change.

Effect of the Invention

According to the present invention, it becomes possible to suppress variances of characteristics of the metal reflective film due to a temporal change.

In addition, according to the present invention, the metal reflective film can be formed of an inexpensive material.

Therefore, according to the present invention, a durable read-only optical recording medium having less variances in characteristics of a metal reflective film due to a temporal change can be realized at low costs.

BRIEF DESCRIPTION OF DRAWINGS

FIGS. 8A and 8B are diagrams showing changes in reflectance before and after an acceleration test of the read-only optical recording medium according to Examples 1 and 2.

BEST MODES FOR CARRYING OUT THE INVENTION

Hereinafter, best modes of the present invention (hereinafter, referred to as embodiments) will be described.

It should be noted that descriptions will be made in the following order.
1. First embodiment
2. Second embodiment
3. Modified examples
4. Examples

1. FIRST EMBODIMENT

Figure 1:
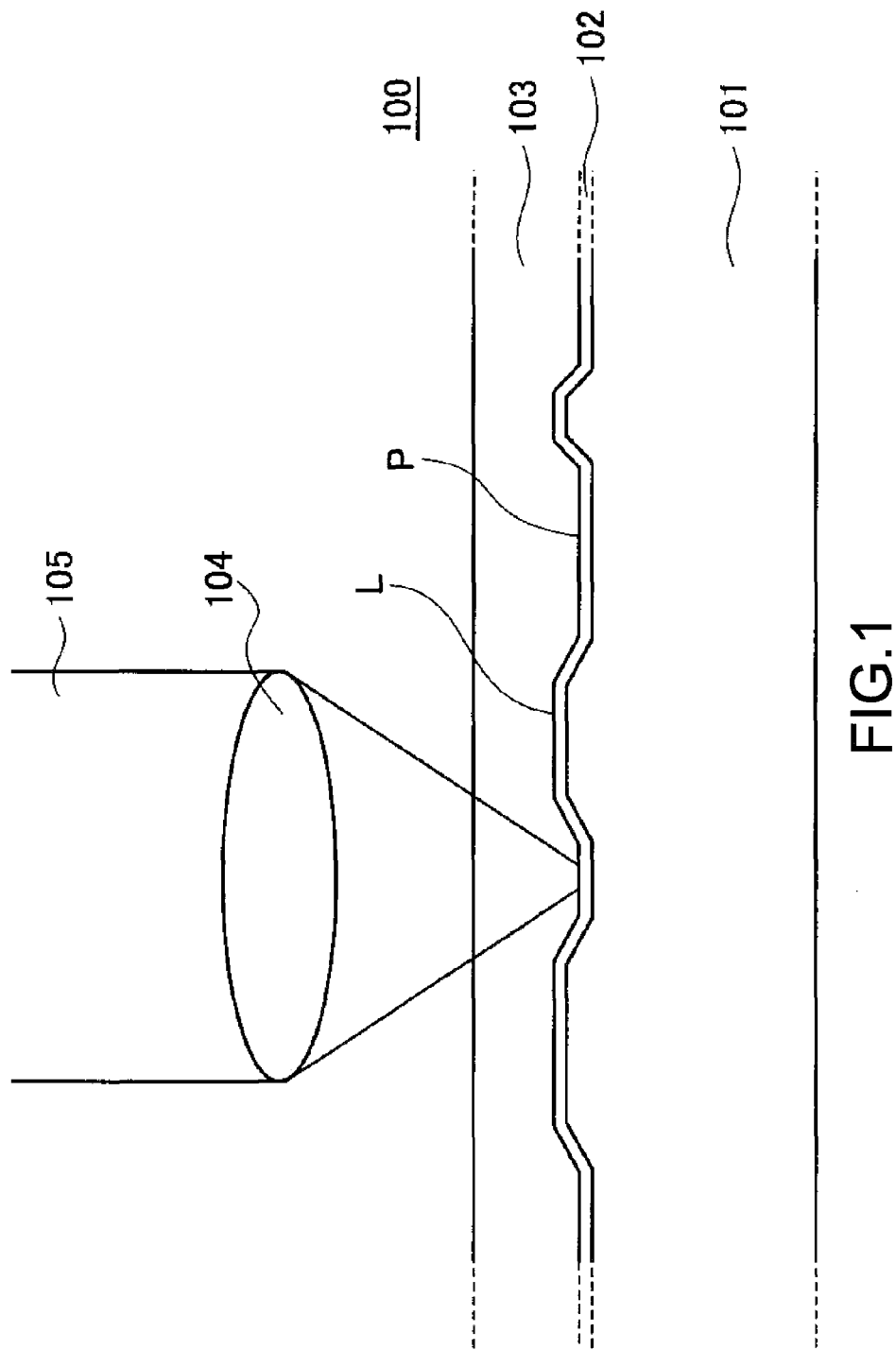
FIG. 1 A schematic structural diagram (cross-sectional diagram) of a read-only optical recording medium according to a first embodiment of the present invention.

FIG. 1 shows a schematic structural diagram (cross-sectional diagram) of a read-only optical recording medium according to a first embodiment of the present invention.

An optical disc 100 has a multilayer structure in which a metal reflective film 102 and a cover layer 103 are laminated on a substrate 101.

As the substrate 101, a plastic substrate formed of, for example, polycarbonate can be used.

A surface of the substrate 101 that comes into contact with the metal reflective film 102 has a concavo-convex cross-sectional shape. The concave cross-sectional portions correspond to pits P, and the convex cross-sectional portions correspond to lands L. Specifically, the convex cross-sectional portions onto which laser light 105 is irradiated from the cover layer 103 and that protrude toward a light-incident side of the laser light 105 are the lands L. Information is recorded using a combination of the pits P and lands L, more specifically, lengths of the pits P and lands L.

The metal reflective film 102 is laminated on the concavo-convex surface of the substrate 101 on which the pits P and lands L are formed. Then, the cover layer 103 is laminated on the metal reflective film 102.

As the material of the cover layer 103, a polycarbonate resin film or a film obtained by irradiating ultraviolet rays onto an ultraviolet-curable resin spin-coated to a predetermined thickness and solidifying it can be used, for example.

The metal reflective film 102 has a concavo-convex cross-sectional shape corresponding to the pits P and lands L by being laminated on the substrate 101.

Moreover, onto the metal reflective film 102, the laser light 105 collected by an objective lens 104 is irradiated via the cover layer 103 as shown in FIG. 1. At this time, reflective light corresponding to the concavo-convex shape is obtained.

In this embodiment, particularly the metal reflective film 102 is formed of an Al alloy represented by $Al_{100-x-z}X_xZ_z$ (x and z are each atomic %).

Here, X includes Ti (titanium), and Z includes Fe (iron).

In addition, a composition x of X and a composition z of Z in the Al alloy are set to be within the ranges of x=1.0 to 3.0 and z=0.05 to 1.0.

It should be noted that X may include W, Ta, V, Mo, Nb, and Zr in addition to Ti as a main component. Z may include Co and Ni in addition to Fe as a main component.

Figure 2:
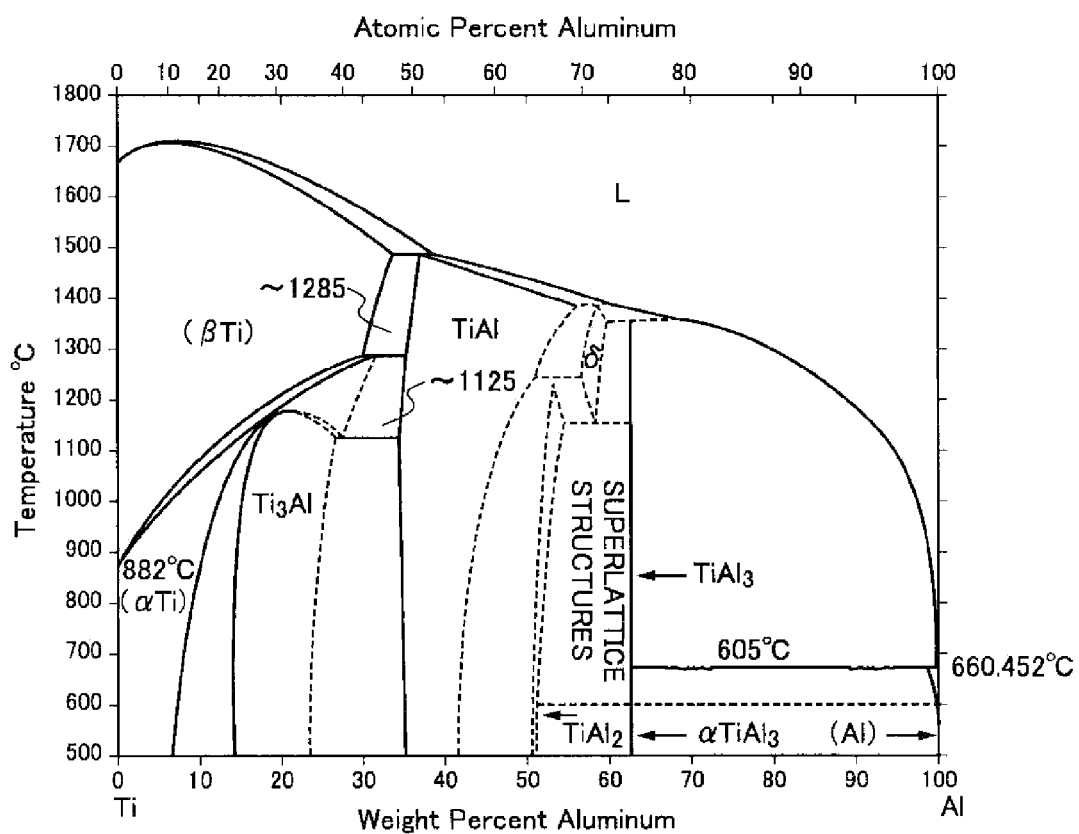
FIG. 2 A Ti—Al-base phase diagram.

FIG. 2 shows an Al—Ti-base phase diagram.

A concentration at which Ti becomes fully solute in Al is up to Al 98.5%-Ti 1.5% (numerals are each atomic %). However, even when the Ti concentration is higher than 1.5%, by uniformly dispersing an intermetallic compound of TiAl3, it is possible to make it act like an alloy.

Further, an upper limit of a range in which the metal reflective film 102 can be made sufficiently uniform is considered to be Al 97%-Ti 3% (numerals are each atomic %).

When a content x of X including Ti exceeds 3.0 atomic %, it becomes difficult to make the metal reflective film 102 sufficiently uniform.

Moreover, when the content x of X including Ti falls below 1.0 atomic % or a content z of Z including Fe falls below 0.05 atomic % or exceeds 1.0 atomic %, there is a fear that sufficient durability and characteristics of the metal reflective film 102 may not be obtained.

An Al alloy of the metal reflective film 102 can be formed by, for example, a vapor deposition method or a sputtering method.

As a sputtering target, a target having the same composition as the alloy may be used. Moreover, targets having a plurality of different compositions each including an alloy component may be used in combination at the same time.

In particular, the optical disc 100 of this embodiment can be favorably applied to an optical disc that uses light having a wavelength of 405 nm (e.g., blue laser) to read out information recorded onto the substrate 101 using a combination of pits and lands.

According to the optical disc 100 of this embodiment described above, the metal reflective film 102 is an Al alloy represented by $Al_{100-x-z}X_xZ_z$, where X includes Ti, Z includes Fe, a content x of X (atomic %) is 1.0 to 3.0, and a content z of Z (atomic %) is 0.05 to 1.0. Accordingly, variances in characteristics of the metal reflective film 102 (e.g., reflectance with respect to light having relatively-short wavelength such as light having wavelength of 405 nm) due to a temporal change can be suppressed.

Moreover, the metal reflective film 102 can be formed of an Al alloy that is an inexpensive material.

Therefore, according to this embodiment, a durable optical disc 100 having less variances in characteristics of the metal reflective film 102 due to a temporal change can be realized at low costs.

2. SECOND EMBODIMENT

A structure of a read-only optical recording medium according to a second embodiment of the present invention will be described.

A cross-sectional structure of the read-only optical recording medium is the same as that of the optical disc 100 of the first embodiment shown in FIG. 1.

In this embodiment, the metal reflective film 102 is formed of an Al alloy represented by $Al_{100-x-z}X_xZ_z$ (x and z each represent atomic %) as in the first embodiment. In addition, X includes Ti, Z includes Fe, a content x of X (atomic %) is 1.0 to 3.0, and a content z of Z (atomic %) is 0.05 to 1.0.

In this embodiment, the metal reflective film 102 of the optical disc 100 shown in FIG. 1 has a structure as a recordable metal reflective film in which sub-data different from main data recorded by pits and lands is recorded.

When the content x of X including Ti exceeds 3.0 atomic %, it becomes difficult to make the metal reflective film 102 sufficiently uniform.

Moreover, when the content x of X including Ti falls below 1.0 atomic % or the content z of Z including Fe falls below 0.05 atomic %, a sufficient recording sensitivity cannot be obtained. Furthermore, when z exceeds 1.0 atomic %, there is a fear that sufficient durability for the metal reflective film 102 may not be obtained. In particular, there is a fear that reproduction signal outputs of sub-data recorded onto the metal reflective film 102 may vary due to a temporal change in this embodiment.

In this embodiment, since sub-data is recorded onto the metal reflective film 102 of the optical disc 100, the production method for an optical disc 100 differs from that of normal optical recording media that are not recorded with sub-data.

Here, an embodiment of the production method for a read-only optical recording medium of this embodiment will be described with reference to FIG. 3.

Figure 3:
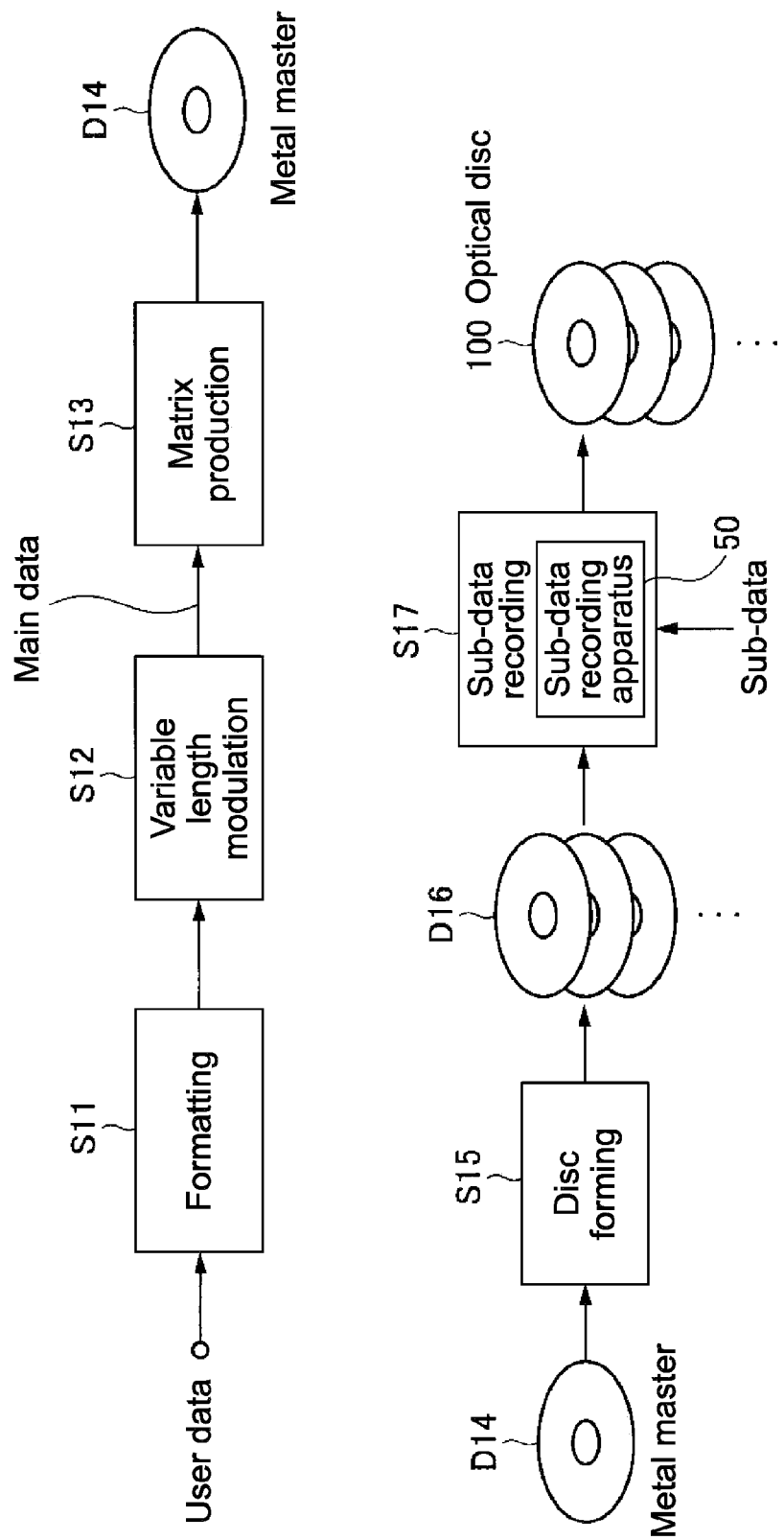
FIG. 3 A diagram for explaining an embodiment of a production method for a read-only optical recording medium according to a second embodiment of the present invention.

As shown in FIG. 3, a user data formatting step S11 is executed first. The formatting step S11 is carried out using, for example, a computer.

In the formatting step S11, content data (user data) that is to be recorded onto the optical disc 100 is subjected to a conversion operation so that a format data string conforming to a predetermined standard is obtained. Moreover, in actuality, processing of adding an error detection code and an error correction code to the user data, interleave processing, and the like are carried out.

Next, a variable length modulation step S12 is carried out. In the step S12, variable length modulation processing is carried out on the data string generated in the formatting step S11.

Patterns of "0" and "1" in the data string obtained by the variable length modulation step S12 become patterns of the pits P and lands L that are actually formed on the optical disc 100.

As described above, data obtained by subjecting user data to the formatting and variable length modulation processing will herein be referred to as main data.

Subsequently, a master production step S13 is carried out. The master production step S13 is carried out using a well-known mastering apparatus.

First, in the master production step S13, a photoresist is formed on a glass master. Then, the glass master on which a photoresist is formed is irradiated with laser light that has been modulated according to main data generated by the variable length modulation step S12 while being driven rotationally and subjected to development processing. As a result, concavo-convex patterns are formed along recording tracks. In other words, pits P and lands L are formed.

Next, electrolytic plating is performed on the glass master on which pits and lands are formed and peeled off after that, with the result that a metal master D14 is produced.

A disc forming step S15 is carried out using the metal master D14 produced as described above.

In the disc forming step S15, a stamper is first formed based on the metal master D14. Then, after placing the stamper in a molding die, a substrate 101 is formed by a transparent resin such as polycarbonate and acryl using an injection molding machine. On the substrate 101, patterns of pits and lands corresponding to the main data generated by the variable length modulation step S12 are formed along the recording tracks.

Then, using a deposition metal alloy target of the metal reflective film 102, the metal reflective film 102 is formed by vapor deposition, sputtering, and the like with respect to the substrate 101. After that, the cover layer 103 is laminated on the metal reflective film 102. As a result, optical disc (main data recording disc) D16 on which only the main data is recorded is formed.

Subsequently, a sub-data recording step S17 is carried out. In other words, sub-data is recorded in addition to the main data recorded by the pits P and lands L described above. To record sub-data, a sub-data recording apparatus 50, details of which will be described later, is used.

In this case, regarding sub-data, as production of real data to be a data content portion thereof, information unique to each optical disc D16 on which main data is recorded, such as serial number information, is recorded. In other words, unique identification information (identification number) is added to each optical disc 100 in the sub-data recording step S17.

Further, as sub-data, an error correction code is added in addition to the identification information as real data, for example. By adding such an error correction code, error correction processing can be carried out on the identification information during reproduction.

The sub-data is recorded by forming marks generated by irradiating laser light having recording power onto the metal reflective film 102 at a certain position in a certain section of main data formed by the pits P and lands L.

Although the sub-data includes identification information and an error correction code in this case, other data may be added instead.

(Sub-Data Recording Apparatus)

Next, an embodiment of the sub-data recording apparatus described above that records sub-data onto the read-only optical recording medium of the second embodiment such as an optical disc D16 will be described.

Figure 4:
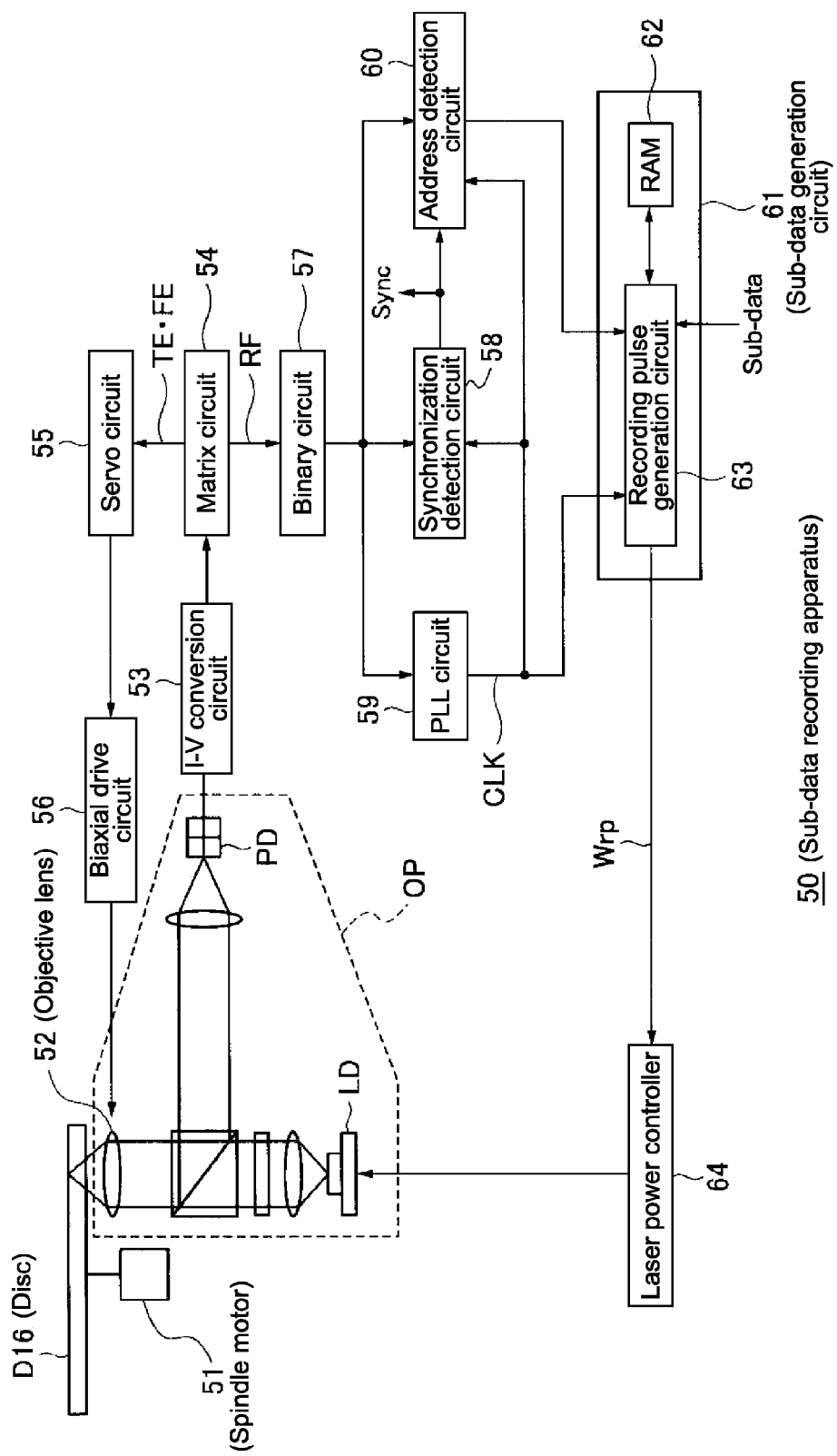
FIG. 4 A structural diagram showing an embodiment of a recording apparatus for sub-data that is used with respect to the read-only optical recording medium according to the second embodiment of the present invention.

FIG. 4 shows a structural diagram (block diagram) showing the embodiment of the sub-data recording apparatus.

Since identification information unique to each optical disc 100 is recorded as a data content of sub-data as described above, the sub-data recording apparatus 50 records sub-data formed by patterns different for each optical disc 100 (D16) to be mounted.

Further, for the sub-data, sections for recording the sub-data are determined in advance on the optical disc D16, and positions at which marks are inserted are also determined in advance within those sections. The sub-data recording apparatus 50 is structured to be capable of recording a mark at a certain position that is determined in advance as described above.

First, the optical disc D16 is driven rotationally by a spindle motor 51 according to a predetermined rotary drive system while being mounted on a turn table (not shown). An optical pickup OP reads out a recording signal (main data) from the optical disc D16 that is driven rotationally as described above.

The optical pickup OP is equipped with a laser diode LD as a laser light source, an objective lens 52 for collecting and irradiating laser light on/onto the recording surface of the optical disc 100, a photodetector PD that detects reflective light as laser light reflected from the optical disc D16, and the like.

Reflective light information detected by the photodetector PD of the optical pickup OP is converted into an electric signal by an I-V conversion circuit 53 and supplied to a matrix circuit 54 after that. The matrix circuit 54 generates, based on the reflective light information from the I-V conversion circuit 53, a reproduction signal RF, a tracking error signal TE, and a focus error signal FE.

A servo circuit 55 controls, based on the tracking error signal TE and the focus error signal FE from the matrix circuit 54, a tracking drive signal TD and a focus drive signal FD that are output from a biaxial drive circuit 56. The tracking drive signal TD and the focus drive signal FD are supplied to a biaxial mechanism (not shown) that holds the objective lens 52 in the optical pickup OP. Then, based on those signals, the objective lens 52 is driven in a tracking direction and a focus direction.

In a tracking-servo/focus-servo system constituted of the servo circuit 55, the biaxial drive circuit 56, and the biaxial mechanism, the servo circuit 55 performs control based on the tracking error signal TE and the focus error signal FE. Accordingly, the servo circuit 55 controls a beams spot of laser light irradiated onto the optical disc D16 to trace a pit string (recording track) formed on the optical disc D16 and controls an appropriate focus state to be maintained.

Furthermore, the reproduction signal RF generated by the matrix circuit 54 is supplied to a binary circuit 57 to be converted into binary data of "0" and "1" therein. The binary data is supplied to a synchronization detection circuit 58 and a PLL (Phase Locked Loop) circuit 59.

The PLL circuit 59 generates clocks CLK synchronized with the supplied binary data and supplies them as operation clocks of requisite portions. In particular, the clocks CLK are also supplied as operations clocks of the binary circuit 57, the synchronization detection circuit 58, an address detection circuit 60, and a sub-data generation circuit 61.

The synchronization detection circuit 58 detects a sync pattern inserted into each frame from the supplied binary data. Specifically, a 9T section as the sync pattern in this case is detected to thus detect a frame synchronization.

A frame synchronization signal is supplied to the requisite portions such as the address detection circuit 60.

The address detection circuit 60 detects address information based on the binary data supplied as the frame synchronization signal. The detected address information is supplied to a controller (not shown) that performs overall control of the sub-data recording apparatus 50 and used in a seek operation and the like. Moreover, the address information is also supplied to a recording pulse generation circuit 63 in the sub-data generation circuit 61.

The sub-data generation circuit 61 includes the recording pulse generation circuit 63 and a RAM (Random Access Memory) 62 as shown in the figure. Based on the input sub-data, the address information supplied from the address detection circuit 60, and the clocks CLK supplied from the PLL circuit 59, the sub-data generation circuit 61 generates a recording pulse signal Wrp for recording sub-data to be recorded.

A laser power controller 64 controls laser power of the laser diode LD in the optical pickup OP based on the recording pulse signal Wrp output from the sub-data generation circuit 61. Specifically, the laser power controller 64 performs control such that a laser output of reproduction power can be obtained when the recording pulse signal Wrp is at an L (low) level, and performs control such that recording power can be obtained when the recording pulse signal Wrp is at an H (high) level.

By laser light of recording power being irradiated under control of the laser power controller 64, a mark is formed on the metal reflective film 102 at the laser irradiation portion.

By the mark formed on the metal reflective film 102 as described above, sub-data is recorded onto the optical disc D16.

Figure 5:
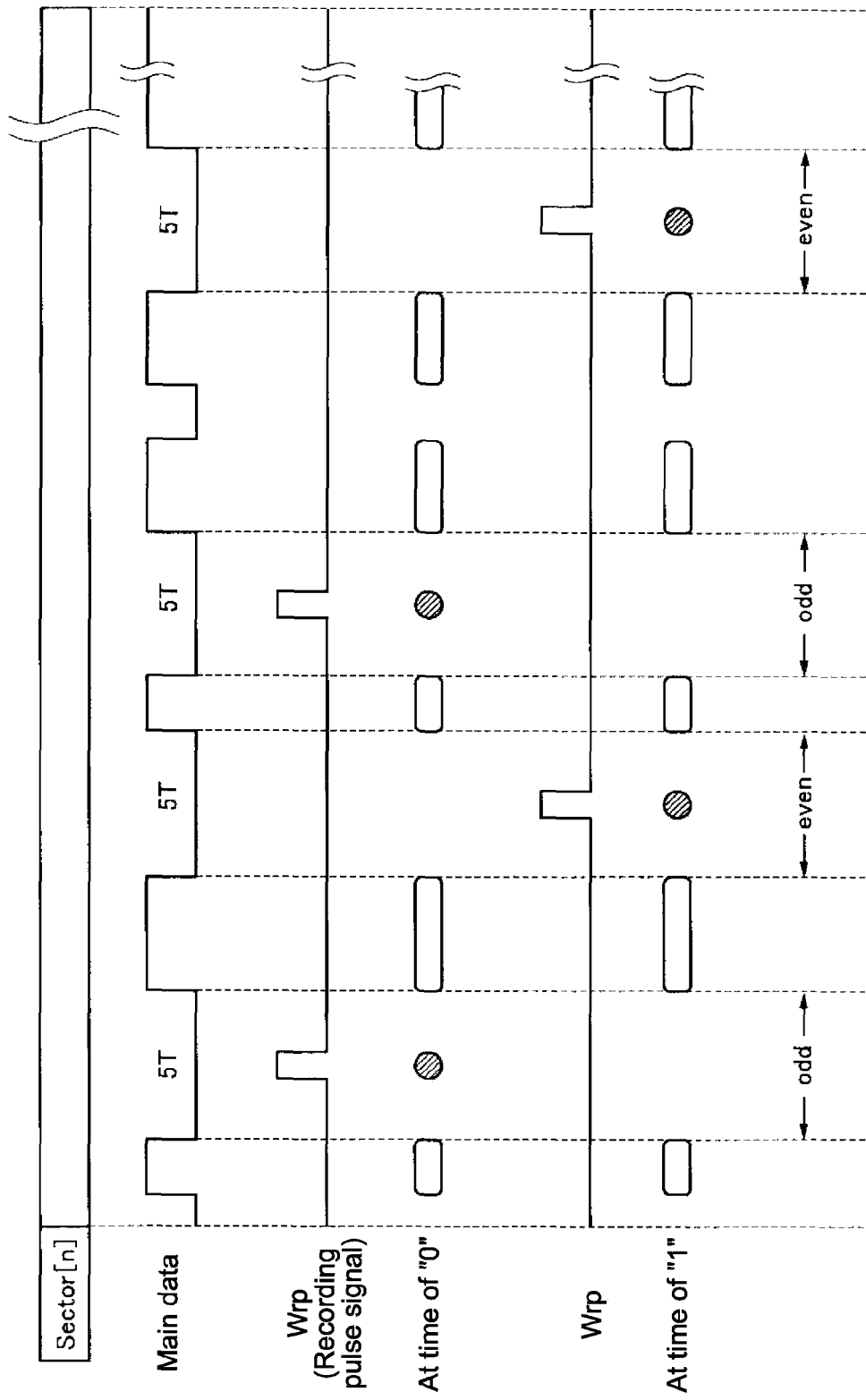
FIG. 5 An explanatory diagram for recording sub-data onto the read-only optical recording medium according to the second embodiment of the present invention.

FIG. 5 is an explanatory diagram for sub-data recording carried out by an operation of the sub-data generation circuit 61 shown in FIG. 4.

FIG. 5 shows an example of cases where "0" and "1" are recorded as 1-bit codes constituting sub-data.

First, as a method of expressing a code, for lands of a predetermined length that exist in main data, an odd-number land and an even-number land adjacent to each other are considered one set. Then, for each set of adjacent odd- and even-number lands having a predetermined length, "0" is recorded when a mark is recorded onto the odd-number land and "1" is recorded when a mark is recorded onto the even-number land.

FIG. 5 shows an example where marks are recorded onto 5T lands as the lands having the predetermined length. It should be noted that although the example where marks are formed on the lands having the predetermined length is explained, marks may also be formed on pits having a predetermined length.

In this case, 1 address unit as a unit corresponding to one address is allocated as a section allocated to recoding of 1-bit codes constituting sub-data.

In other words, as shown in FIG. 5, marks are recorded in a form that expresses the same code for each set of odd- and even-number lands having a predetermined length that are adjacent to each other within 1 address unit. Specifically, when recording the code "0", marks are recorded on only the odd-number lands having the predetermined length within 1 address unit. Moreover, when recording the code "1", marks are recorded on only the even-number lands having the predetermined length within 1 address unit.

During reproduction, sampling is performed on the reproduction signal RF for each set of odd- and even-number lands having a predetermined length within 1 address unit, and a value of the reproduction signal RF sampled at the even number is subtracted from a value of the reproduction signal RF sampled at the odd number. In other words, an "odd-even" operation is carried out.

Here, an example where a reproduction signal level of a recorded mark becomes higher than a reproduction signal level at a mark-unrecorded portion will be discussed.

In the case of a code "0" where marks are recorded only on odd-number lands, when such an "odd-even" operation is carried out, a positive value is ideally obtained for each set of adjacent lands having a predetermined length. In other words, by integrating an "odd-even" value calculated for each set of adjacent lands having the predetermined length as described above, a positive value can be positively obtained and detected.

Conversely, in the case of a code "1" where marks are recorded only on even-number lands, the "odd-even" value calculated for each set of adjacent lands having the predetermined length is ideally a negative value. Therefore, by integrating the value, a negative value can be positively obtained and detected.

It should be noted that the reproduction signal level may be changed to be low. In this case, the allocation of odd/even numbers of recording marks or the operation order only needs to be changed so that a desired code is obtained as a result of the operation described above.

As described above, by repetitively recording the same recording pattern for a certain section and judging one value based on a plurality of same recording patterns during reproduction, variances in reflectance due to recording of marks become minute.

By thus suppressing the variances in the reflectance accompanying the mark recording to be minute, it becomes possible to prevent the binary processing for main data from being influenced by the recorded marks.

Also for other codes constituting sub-data, marks are recorded by the same method as that described above.

Specifically, in this case, the sub-data is recorded across the same number of address units as the codes constituting the sub-data.

The section for recording sub-data (hereinafter, also referred to as sub-data recording target section) as described above is determined between the sub-data recording apparatus 50 and the reproducing apparatus in advance. Therefore, the sub-data recording apparatus 50 is structured to execute the mark recording described above across the plurality of address units as the sub-data recording target section that has been determined in advance as described above.

It should be noted that in the recording method described above, there is a possibility that binarization of main data may not be performed correctly when marks to be recorded onto lands having a predetermined length are recorded at edge portions. In other words, when marks are recorded at edge portions of the lands having the predetermined length as described above, the reflectance at the mark recording portions tends to increase that much, with the result that an incorrect land length (or pit length) may be detected in the binarization processing.

In this regard, marks are recorded at center portions of lands as recording targets. Accordingly, since edge portions can be obtained as usual, this point also prevents the binarization processing from being influenced.

For the recording operation as described above, the recording pulse generation circuit 63 of the sub-data generation circuit 61 shown in FIG. 4 generates a recording pulse signal Wrp at timings as shown in FIG. 5.

Specifically, a recording pulse signal Wrp with which the H level is obtained only at the center portions of odd-number lands having a predetermined length is generated with respect to the code "0".

Moreover, a recording pulse signal Wrp with which the H level is obtained only at the center portions of even-number lands having the predetermined length is generated with respect to the code "1".

Next, an embodiment of the reproducing apparatus that performs reproduction with respect to the optical disc 100 on which sub-data is recorded by marks formed on the metal reflective film 102 will be described.

(Reproducing Apparatus)

Figure 6:
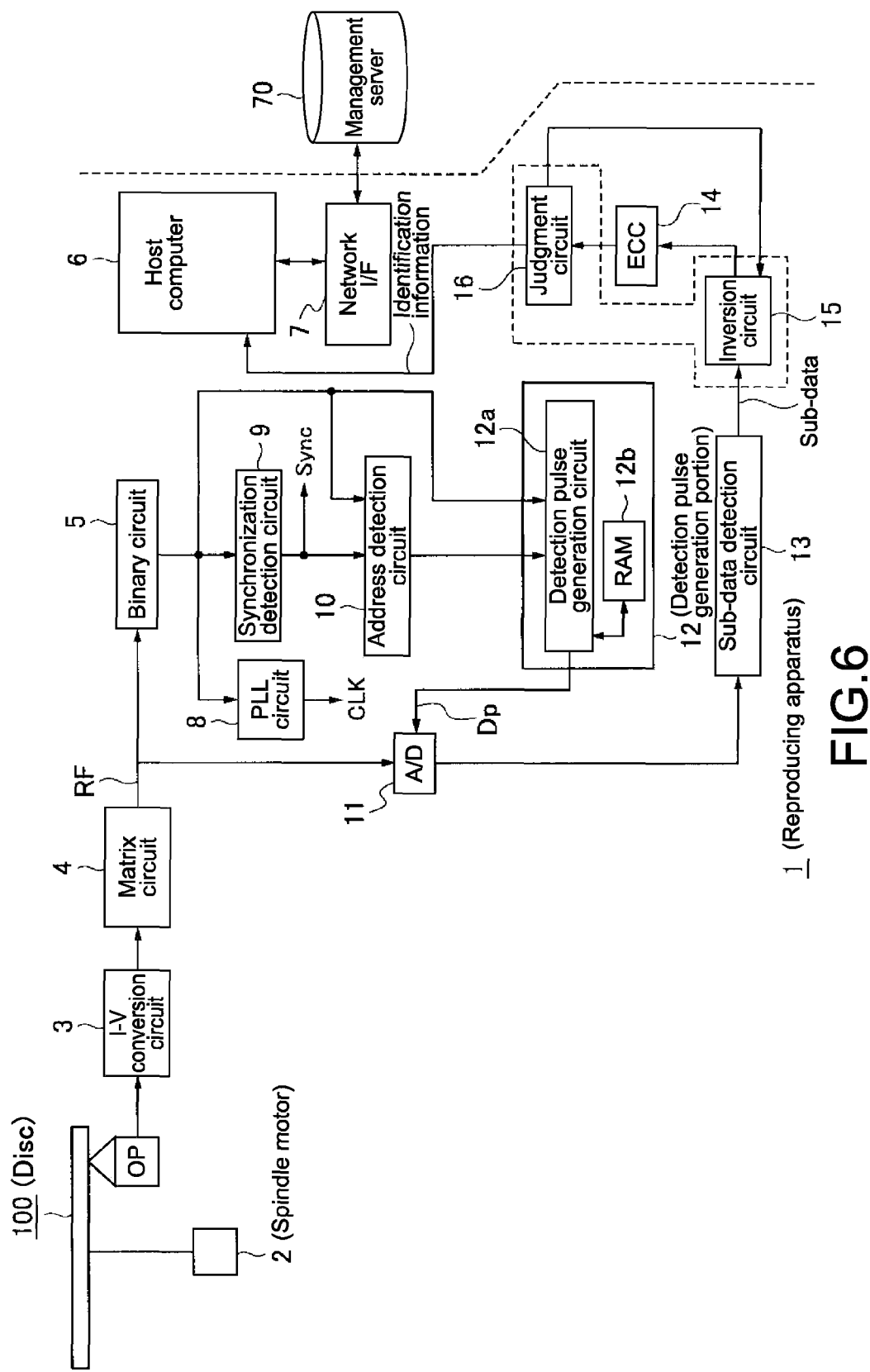
FIG. 6 A structural diagram showing an embodiment of a reproducing apparatus for sub-data that is used with respect to the read-only optical recording medium according to the second embodiment of the present invention.

FIG. 6 is a block diagram showing a structure of the reproducing apparatus 1.

It should be noted that in FIG. 6, only portions that are mainly related to reproduction of sub-data are extracted, and an illustration of a structure of a main data reproduction system, particularly a demodulation system subsequent to the binarization processing, is omitted. Moreover, descriptions on an inversion circuit 15 and a judgment circuit 16 are also omitted.

In the reproducing apparatus 1, the optical disc 100 is driven rotationally by a spindle motor 2 according to a predetermined rotary drive system while being mounted on a turn table (not shown). An optical pickup OP in the figure reads out a recording signal (main data) from the optical disc 100 that is driven rotationally also in this case.

It should be noted that although illustrations are omitted, the optical pickup OP in this case is also equipped with a laser diode as a laser light source and an objective lens that collects/irradiates laser light on/onto the recording surface of the optical disc 100. In addition, a biaxial mechanism that holds the objective lens such that it can be moved in the tracking and focus directions, a photodetector that detects reflective light based on the laser light irradiation from the optical disc 100, and the like are provided.

Further, in the reproducing apparatus 1, laser light that is irradiated onto the optical disc 100 is based on reproduction power.

Reflective light information detected by the photodetector in the optical pickup OP is converted into an electric signal by an I-V conversion circuit 3 and supplied to a matrix circuit 4 after that. The matrix circuit 4 generates a reproduction signal RF based on the reflective light information from the I-V conversion circuit 3.

Further, although not shown, as the signal generated by the matrix circuit 4, there are also a tracking error signal TE and a focus error signal FE. Those signals are supplied to a servo circuit (not shown) to be used in a tracking servo control operation and a focus servo control operation.

The reproduction signal RF generated by the matrix circuit 4 is supplied to an A/D converter 11 to be described later as well as a binary circuit 5.

The binary circuit 5 converts the supplied reproduction signal RF into binary data of "0" and "1".

Then, the binary data is supplied to a PLL circuit 8, a synchronization detection circuit 9, and an address detection circuit 10.

Moreover, the binary data is also supplied to a detection pulse generation circuit 12a of a detection pulse generation portion 12 to be described later.

The PLL circuit 8 generates clocks CLK synchronized with the supplied binary data and supplies them as operation clocks of requisite portions. In particular, the clocks CLK in this case are also supplied to the detection pulse generation circuit 12a though not shown.

The synchronization detection circuit 9 detects a sync portion inserted into each frame from the supplied binary data. Specifically, a 9T section as the sync pattern in this case is detected to thus detect a frame synchronization.

A frame synchronization signal is supplied to the requisite portions such as the address detection circuit 10.

The address detection circuit 10 detects address information from the supplied binary data based on the frame synchronization signal. The detected address information is supplied to a controller (not shown) that performs overall control of the reproducing apparatus 1 and used in a seek operation and the like. Moreover, the address information is also supplied to the detection pulse generation circuit 12a of the detection pulse generation portion 12.

It should be noted that the optical pickup OP, the I-V conversion circuit 3, the matrix circuit 4, the binary circuit 5, the PLL circuit 8, the synchronization detection circuit 9, and the address detection circuit 10 described heretofore are portions that are also used during reproduction of main data recorded onto the optical disc 100.

In other words, those portions are portions that share the main data reproduction system in reproducing sub-data.

The detection pulse generation portion 12 generates, in reproducing identification information as sub-data, a detection pulse signal Dp that indicates a detection point corresponding to a mark recording method that is shared with the sub-data recording apparatus 50.

The detection pulse generation portion 12 is equipped with the detection pulse generation circuit 12a and a RAM 12b. The detection pulse generation circuit 12a generates the detection pulse signal Dp based on information stored in the RAM 12b. Then, the generated detection pulse signal Dp is supplied to the A/D converter 11.

To the A/D converter 11, a reproduction signal RF from the matrix circuit 4 is supplied.

The A/D converter 11 samples the supplied reproduction signal RF at a timing instructed by the detection pulse signal Dp and supplies a value of the signal to a sub-data detection circuit 13. The sub-data detection circuit 13 performs a predetermined operation on the value supplied from the A/D converter 11 and detects values of the sub-data. In other words, in this case, for example, the values of the sub-data are detected as a result of performing an operation corresponding to the "odd-even" operation described above.

The values of the sub-data detected by the sub-data detection circuit 13 are supplied to an ECC (Error Correcting Code) circuit 14.

The sub-data in this case includes identification information and an error correction code. In the ECC circuit 14, identification information is reproduced by carrying out error correction processing based on the error correction code in the sub-data.

The reproduced identification information is supplied to a host computer 6 shown in the figure.

The host computer 6 instructs various operations by transmitting commands to a controller (not shown) that performs overall control of the reproducing apparatus 1. For example, a command that instructs to reproduce main data recorded onto the optical disc 100 is transmitted. In response to the command, the main data reproduced from the optical disc 100 is binarized by the binary circuit 5 and subjected to demodulation (RLL1-7PP demodulation) in a demodulation system (not shown), error correction processing, and the like after that to thus be supplied to the host computer 6.

Moreover, the host computer 6 is equipped with a network interface 7 for performing data communication via a required network. Accordingly, the host computer 6 is capable of performing data communication with an external apparatus, particularly a management server 70 shown in the figure, via a predetermined network such as the Internet.

An operation of detecting (reproducing) values of sub-data, that is carried out by the reproducing apparatus 1 having the structure described above, will be described with reference to FIG. 7.

Figure 7:
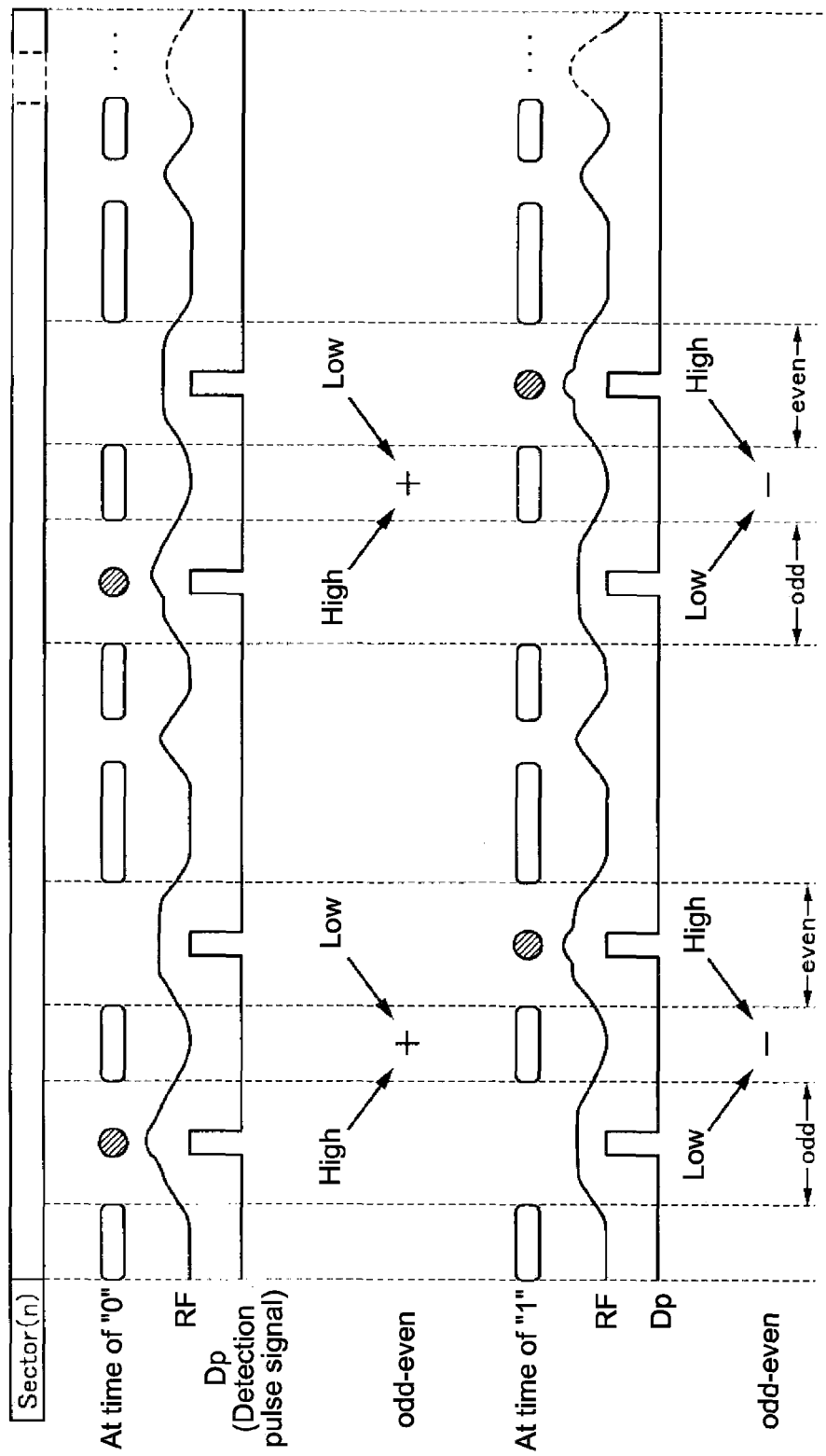
FIG. 7 An explanatory diagram for reproducing sub-data from the read-only optical recording medium according to the second embodiment of the present invention.

FIG. 7 shows mark recording states in cases where "0" and "1" are allocated to a 1 address unit on the optical disc 100 as a 1-bit value of sub-data. It should be noted that FIG. 7 shows a case where pits and lands as main data are formed in the same pattern.

First, as described above, as sub-data, 1-bit information is allocated to and recorded on each address unit in a predetermined sub-data recording target section on the optical disc 100.

Further, as the method of expressing a code in this case, "0" is defined when marks are recorded onto odd-number lands having a predetermined length and "1" is defined when marks are recorded onto even-number lands. In other words, as shown in FIG. 7, in the case of the code "0", marks are recorded only on the odd-number lands out of the lands having the predetermined length in the address unit. Moreover, in the case of the code "1", marks are recorded only on the even-number lands out of the lands having the predetermined length in the address unit.

Here, portions at which marks are recorded become portions at which reflectance minutely increases, for example. Accordingly, as a waveform of the reproduction signal RF, a level of the signal increases at the portions at which marks are recorded as shown in the figure.

In reproducing sub-data, an operation of judging values is carried out based on such a minute increase of the reflectance at the mark recording portions.

It should be noted that by recording marks at the center portion of the lands as described above, the level increases only at the center portion of the lands onto which marks are recorded as can be seen from the waveforms of the reproduction signal RF shown in FIG. 7, and thus waveforms at edge portions are as usual. As a result, it is possible to prevent binarization of main data from being influenced as described above.

Here, according to the descriptions above, in the case of the code "0", the value of the reproduction signal RF minutely increases only at the odd-number lands having the predetermined length. Moreover, in the case of the code "1", the value of the reproduction signal RF minutely increases only at the even-number lands having the predetermined length.

Therefore, in this case, in judging the values of sub-data allocated to each address unit, it is only necessary to detect which of the odd- and even-number lands having the predetermined length in the address unit have increased value of the reproduction signal RF.

The increase of the value of the reproduction signal RF at the mark recording portions can be detected by, for example, calculating a difference from the value of the reproduction signal RF at the mark-unrecorded portions.

At this time, the fact that marks are recorded only on odd-number lands when the code is "0" and marks are recorded only on even-number lands when the code is "1" as described above means that the even-number lands always become unrecorded portions when the code is "0" and the odd-number lands always become unrecorded portions when the code is "1".

Thus, by carrying out the "odd-even" operation on the adjacent odd- and even-number lands, it is possible to check which of the odd and even has an increased value of the reproduction signal RF (marks are recorded).

Specifically, when the "odd-even" takes a positive value, it can be seen that the value of the reproduction signal RF is increased at the odd-number lands and that marks are recorded onto the odd-number lands. Conversely, when the "odd-even" takes a negative value, it can be seen that the value of the reproduction signal is increased at the even-number lands and that marks are recorded onto the even-number lands.

It should be noted that in actuality, a noise component is superimposed on the reproduction signal RF. A decrease of the value of the reproduction signal RF at the mark recording portions is minute and thus may be buried in such a noise component. Therefore, it becomes difficult to positively judge the value by merely performing a detection using "odd-even" for a set of adjacent even-number lands having a predetermined length.

Therefore, as the reproduction operation for sub-data, a value of "odd-even" calculated for each set of adjacent odd- and even-number lands as described above is integrated, and a 1-bit value allocated to the address unit is judged based on the integral value. The integral value can be handled as a value proportional to the reproduction signal output of sub-data and is sometimes expressed as "Amp value". Thus, the sub-data value can be detected more positively.

Incidentally, for the "odd-even" calculation, it is necessary to sample values of the reproduction signal RF obtained at the center portions of odd and even lands, that is, odd- and even-number lands having a predetermined length. As a signal for instructing the sampling timing for the "odd-even" calculation, the detection pulse generation portion 12 shown in FIG. 6 generates the detection pulse signal Dp shown in the figure.

Here, as the detection pulse signal Dp for the "odd-even" calculation as described above, a signal with which an H level is obtained only at the center portion of the lands that are obtained in main data and have a predetermined length only needs to be generated as can be seen from FIG. 6.

Further, in generating the detection pulse signal Dp, a relevant timing only needs to be generated based on a content of main data recorded in the sub-data recording target section on the optical disc 100 as in generating the recording pulse signal Wrp in the sub-data recording apparatus 50.

It should be noted that since the reproducing apparatus 1 is not used on an optical disc production side unlike the sub-data recording apparatus 50, a content recorded onto the optical disc 100 cannot be stored in advance inside the apparatus.

In this regard, the reproducing apparatus 1 reads out main data of the sub-data recording target section from the mounted optical disc 100 and stores the main data inside the apparatus to use it for generating the detection pulse signal Dp.

As a memory for storing the thus-readout main data of the sub-data recording target section, the RAM 12b of the detection pulse generation portion 12 shown in FIG. 6 is provided in the reproducing apparatus 1. As a data structure, main data read out in accordance with each address is stored.

In the detection pulse generation circuit 12a, based on a content of main data in the recording target section stored in the RAM 12b, a data string in which the code becomes "1" at relevant timings and the code becomes "0" at all the other timings is generated as in the case of generating the recording pulse signal Wrp. Then, the detection pulse signal Dp that is based on the thus-generated data string is generated and supplied to the A/D converter 11. By the A/D converter 11 sampling the value of the reproduction signal RF at timings instructed by the detection pulse signal Dp, the values of the reproduction signal RF can be sampled at appropriate timings as shown in FIG. 7.

In particular, the optical disc 100 of this embodiment can be favorably applied to an optical disc that uses light having a wavelength of 405 nm (e.g., blue laser) for recording sub-data onto the metal reflective film 102 and reading out recorded main data and sub-data.

According to this embodiment, since the composition of the metal reflective film 102 is specified to be within the same range as that in the first embodiment, variances in characteristics of the metal reflective film 102 (e.g. reflectance with respect to light having relatively-short wavelength such as light having wavelength of 405 nm) due to a temporal change can be suppressed.

Moreover, the metal reflective film 102 can be formed of an inexpensive material such as an Al alloy.

Therefore, according to this embodiment, a durable optical disc 100 having less variances in the characteristics of the metal reflective film 102 due to a temporal change can be realized at low costs.

Further, although sub-data is recorded onto the metal reflective film 102 in this embodiment, since the composition of the metal reflective film 102 is specified to be within the same range as that in the first embodiment, lowering of characteristics of sub-data due to a temporal change can also be suppressed. For example, lowering of the reproduction signal output of sub-data due to a temporal change can be suppressed.

In addition, it becomes possible to raise a recording sensitivity with respect to recording of sub-data as compared to the case where an Ag alloy is used for the metal reflective film as in Patent Document 1 described above.

As a result, sub-data can be recorded with relatively-small power. Therefore, operational effects of, for example, shortening a time required for recording sub-data, suppressing variances of the substrate 101 and the cover layer 103 by suppressing heat generated at a time sub-data is recorded, simplifying the structure of the sub-data recording apparatus, and reducing power consumption can be expected.

Moreover, as in the first embodiment, the Al alloy has high reflectance with respect to light having a relatively-short wavelength such as light having a wavelength of 405 nm even when the thickness is smaller than an Ag alloy. As a result, since the thickness for realizing the same reflectance becomes smaller than that of the Ag alloy, it becomes possible to shorten a deposition time and reduce material costs.

3. MODIFIED EXAMPLES

The embodiments above have described the case where data is recorded onto a single information recording surface by pits (main data in second embodiment) and a single metal reflective film 102 is formed with respect to the information recording surface.

The present invention is also applicable to a read-only optical recording medium in which two or more information recording surfaces are provided and a metal reflective film is provided with respect to each of the information recording surfaces.

In a method of producing a read-only optical recording medium including two or more information recording surfaces, there is a method of forming a spacer layer between the information recording surfaces using an ultraviolet-curable resin. In this case, a direction of irradiating ultraviolet rays may vary depending on the production method. However, since ultraviolet rays transmitted through a metal reflective film formed on a substrate is used when irradiating ultraviolet rays from the substrate side, UV transmittance of the metal reflective film is required to be of a certain level or more.

Even in the composition range of the metal reflective film according to the present invention, UV transmittance of a certain level or more can be realized with a composition in which an additive amount of an element (Ti and Fe) to be added is relatively small.

Since sub-data can be recorded with a high recording sensitivity and small power in the metal reflective film according to the present invention, the present invention is also applicable to a case where two or more information recording surfaces are provided.

Moreover, the read-only optical recording medium of the present invention can take other shapes such as a card shape and a stick shape in addition to the normal disc-like read-only optical recording medium as long as it includes an information recording surface and a metal reflective film that comes into contact with the information recording surface.

4. MODIFIED EXAMPLES

The read-only optical recording medium according to the present invention was actually produced to check characteristics thereof.

Experiment 1

Comparison of Temporal Changes of Reflectance

For estimating a lifetime of the read-only optical recording medium, temporal changes of reflectance of a metal reflective film were compared by an acceleration test.

Example 1

A disc-like substrate 101 that is formed of a polycarbonate resin, has concavo-convex patterns of pits P and lands L constituting main data formed on a surface thereof, and has a diameter of 120 mm was prepared.

On the substrate 101, a metal reflective film 102 in which Al includes 2% of Ti and 0.5% of Fe (numerals are each atomic %) was formed by a sputtering method. Conditions for the sputtering method were 3.5 kW and a deposition time of 1.2 sec.

Next, on the metal reflective film 102, a cover layer 103 formed of an ultraviolet-curable resin was formed. The optical disc 100 was produced as described above and used as a sample of Example 1.

Example 2

An optical disc 100 was produced by the same method as Example 1 except that the conditions for the sputtering method for forming the metal reflective film 102 were set to 5.0 kW and a deposition time of 1.2 sec and was thus used as a sample of Example 2. By setting the condition for the sputtering method to be 5.0 kW, the metal reflective film 102 was slightly thicker than the sample of Example 1.

Comparative Example 1

An optical disc 100 was produced by the same method as Example 1 except that an Al alloy film that is the same as that used in a commercially-available digital versatile disc (DVD) was used as the metal reflective film 102, and was thus used as a sample of Comparative Example 1.

Comparative Example 2

An optical disc 100 was produced by the same method as Example 2 except that an Al alloy film that is the same as that used in a commercially-available digital versatile disc (DVD) was used as the metal reflective film 102, and was thus used as a sample of Comparative Example 2.

(Reflectance Measurement)

Reflectance of the metal reflective film 102 was measured for the optical discs 100 as the samples of Examples 1 and 2 and Comparative Examples 1 and 2.

Using a signal evaluation apparatus, reflectance of the metal reflective film 102 with respect to light having a wavelength of 405 nm was measured. For each of 5 areas whose distances from the center of the optical disc 100 differ, the reflectance was measured at several points within the same area.

(Acceleration Test)

Subsequently, an acceleration test for checking a temporal change was carried out on the optical discs 100 as the samples. The acceleration test was carried out for 240 hours under the conditions of a temperature: 80° C. and a humidity: 85% RH.

For the samples that have been subjected to the acceleration test, the reflectance of the metal reflective film 102 was measured by the same method as that before the acceleration test.

Figure 9:
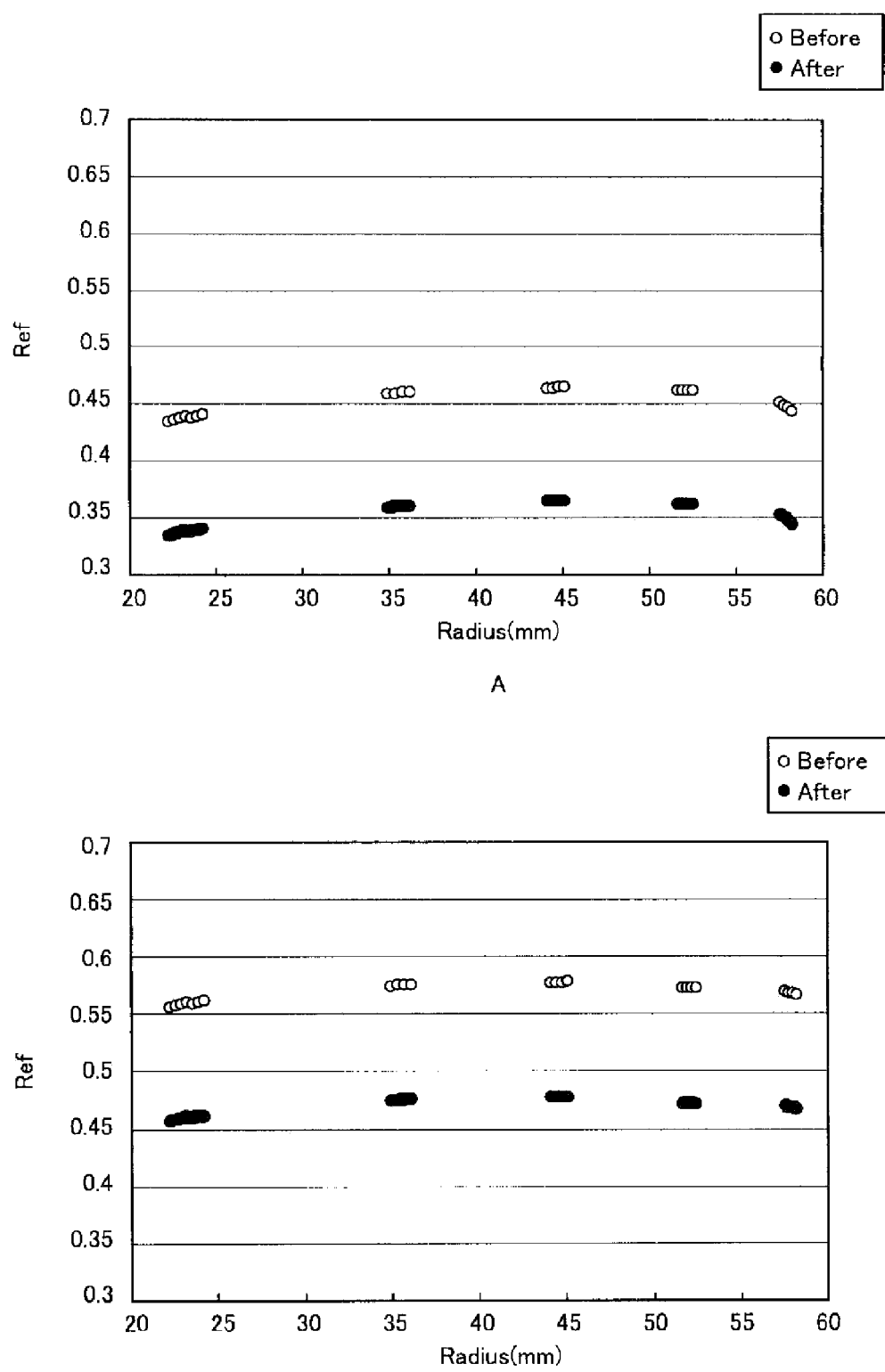
FIGS. 9A and 9B are diagrams showing changes in the reflectance before and after the acceleration test of the read-only optical recording medium according to Comparative examples 1 and 2.

Changes in the reflectance of the samples before and after the acceleration test are shown in FIGS. 8 and 9 as measurement results. FIG. 8A shows a result of the sample of Example 1, FIG. 8B shows a result of the sample of Example 2, FIG. 9A shows a result of the sample of Comparative Example 1, and FIG. 9B shows a result of the sample of Comparative Example 2. In FIGS. 8 and 9, the abscissa axis represents a distance from a radius, that is, the center of the optical disc 100 (mm), and the ordinate axis represents the reflectance.

As can be seen from FIG. 9A, in the sample of Comparative Example 1, the reflectance obtained after the acceleration test decreased about 10% from the reflectance of about 45% obtained before the acceleration test.

As can be seen from FIG. 9B, in the sample of Comparative Example 2, the reflectance obtained after the acceleration test decreased about 10% from the reflectance of about 57% obtained before the acceleration test.

As can be seen from FIG. 8A, in the sample of Example 1, a decrease of the reflectance obtained after the acceleration test from the reflectance of about 45% obtained before the acceleration test is suppressed within 3% to 5%.

As can be seen from FIG. 8B, in the sample of Example 2, a decrease of the reflectance obtained after the acceleration test from the reflectance of about 57% obtained before the acceleration test is suppressed within 1% to 2%.

Therefore, it can be seen that temporal changes of the reflectance can be suppressed with the structure of the read-only optical recording medium according to the present invention as in Examples 1 and 2.

Experiment 2

Signal Output Change of Sub-Data Reproduction Signal after Acceleration Test Next, sub-data recording sensitivities of metal reflective films with respect to light and temporal changes of sub-data reproduction signals were compared.

Example 3

With the condition for the sputtering method set to 4.0 kW, an optical disc 100 was produced by the same method as Example 1 except that a metal reflective film 102 in which Al includes 1.5% of Ti and 0.5% of Fe was formed, and was thus used as a sample of Example 3.

Example 4

An optical disc 100 was produced by the same method as Example 3 except that the condition for the sputtering method was set to be 4.5 kW, and was thus used as a sample of Example 4.

Example 5

An optical disc 100 was produced by the same method as Example 3 except that the condition for the sputtering method was set to be 5.0 kW, and was thus used as a sample of Example 5.

Example 6

An optical disc 100 was produced by the same method as Example 3 except that the condition for the sputtering method was set to be 5.5 kW, and was thus used as a sample of Example 6.

Example 7

An optical disc 100 was produced by the same method as Example 3 except that the condition for the sputtering method was set to be 6.0 kW, and was thus used as a sample of Example 7.

Example 8

An optical disc 100 was produced by the same method as Example 1 except that the condition for the sputtering method was set to be 4.0 kW and a metal reflective film 102 in which Al includes 2.0% of Ti and 0.5% of Fe was formed, and was thus used as a sample of Example 8.

Example 9

An optical disc 100 was produced by the same method as Example 8 except that the condition for the sputtering method was set to be 4.5 kW, and was thus used as a sample of Example 9.

Example 10

An optical disc 100 was produced by the same method as Example 8 except that the condition for the sputtering method was set to be 5.0 kW, and was thus used as a sample of Example 10.

Example 11

An optical disc 100 was produced by the same method as Example 8 except that the condition for the sputtering method was set to be 5.5 kW, and was thus used as a sample of Example 11.

Example 12

An optical disc 100 was produced by the same method as Example 8 except that the condition for the sputtering method was set to be 6.0 kW, and was thus used as a sample of Example 12.

Example 13

An optical disc 100 was produced by the same method as Example 1 except that the condition for the sputtering method was set to be 4.0 kW and a metal reflective film 102 in which Al includes 3.0% of Ti and 0.5% of Fe was formed, and was thus used as a sample of Example 13.

Example 14

An optical disc 100 was produced by the same method as Example 13 except that the condition for the sputtering method was set to be 4.5 kW, and was thus used as a sample of Example 14.

Example 15

An optical disc 100 was produced by the same method as Example 13 except that the condition for the sputtering method was set to be 5.0 kW, and was thus used as a sample of Example 15.

Example 16

An optical disc 100 was produced by the same method as Example 13 except that the condition for the sputtering method was set to be 5.5 kW, and was thus used as a sample of Example 16.

Example 17

An optical disc 100 was produced by the same method as Example 13 except that the condition for the sputtering method was set to be 6.0 kW, and was thus used as a sample of Example 17.

(Measurement of Recording Sensitivity and Sub-Data Reproduction Signal Before and after Acceleration Test)

A recording sensitivity of a sub-data signal was measured for each of the samples of Examples 3 to 17.

Specifically, in the sub-data recording apparatus 50, under the conditions of a numerical aperture N.A.=0.85, a laser wavelength $\lambda$=405 nm, a linear recording speed=4.9 m/s, and a mark recording pulse=30 ns, a mark of sub-data was recorded onto the metal reflective film 102. Then, power of laser light (laser output) was changed to 20, 22, 24, 26, 28, 30, and 32 (unit is mW), and marks of sub-data were recorded at different positions on same the optical disc 100 as the sample.

Reproduction signal outputs were checked by reproducing (reading out) the sub-data for the optical disc 100 onto which the sub-data has been recorded.

Next, an acceleration test was performed on each of the read-only optical recording media as the samples under the same conditions as Example 1.

Then, for the samples that have been subjected to the acceleration test, sub-data recorded before the acceleration test was reproduced (read out) as in the measurement before the acceleration test, and reproduction signal outputs were measured. The measurement results are shown in FIGS. 10 to 15.

In FIGS. 10 to 15, the abscissa axis represents power of laser light (unit is mW), and the ordinate axis represents an Amp value (relative value).

The Amp (Amplitude) value indicates, as the value of the reproduction signal RF as described above, an integral value of a value obtained by subtracting the mark-unrecorded portions from the mark recording portions. In other words, as this value increases, the value of the reproduction signal output at the mark recording portions increases.

Figure 10:
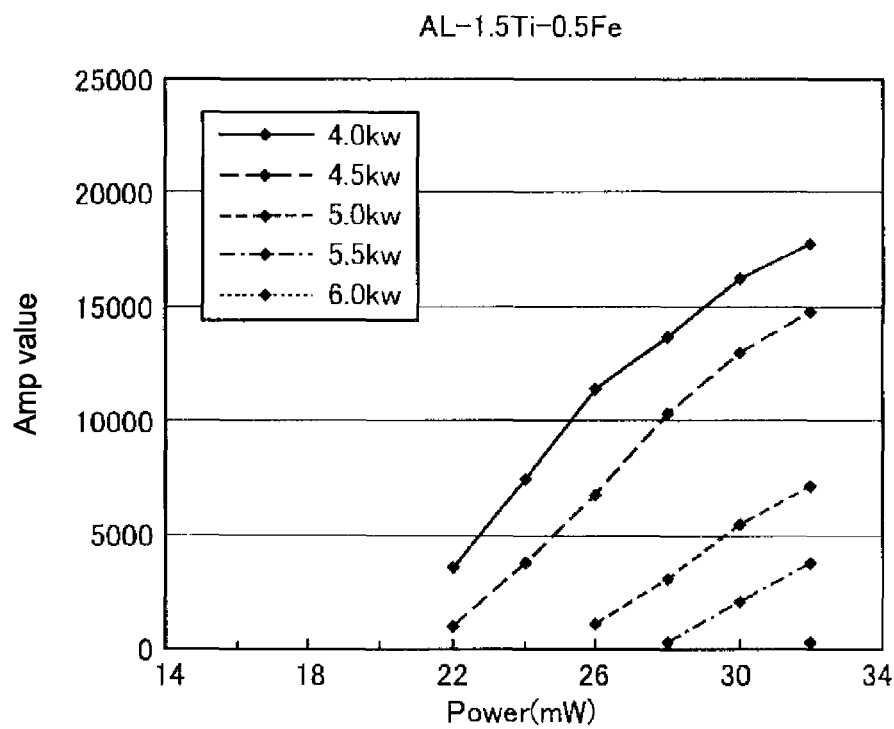
FIG. 10 A diagram showing an initial recording sensitivity of the read-only optical recording medium according to Examples 3 to 7.
Figure 11:
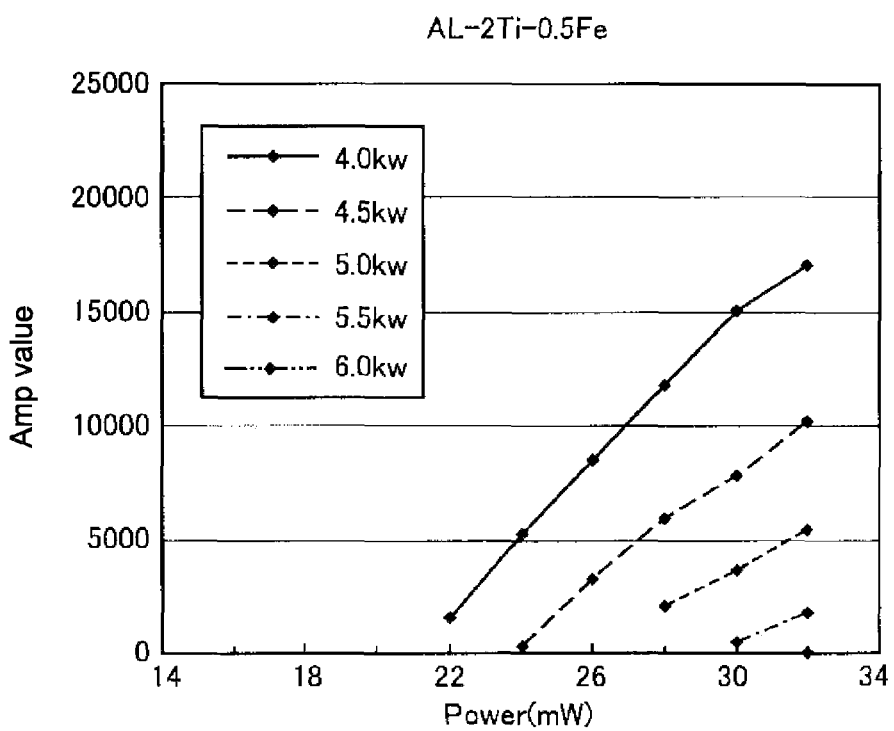
FIG. 11 A diagram showing the initial recording sensitivity of the read-only optical recording medium according to Examples 8 to 12.
Figure 12:
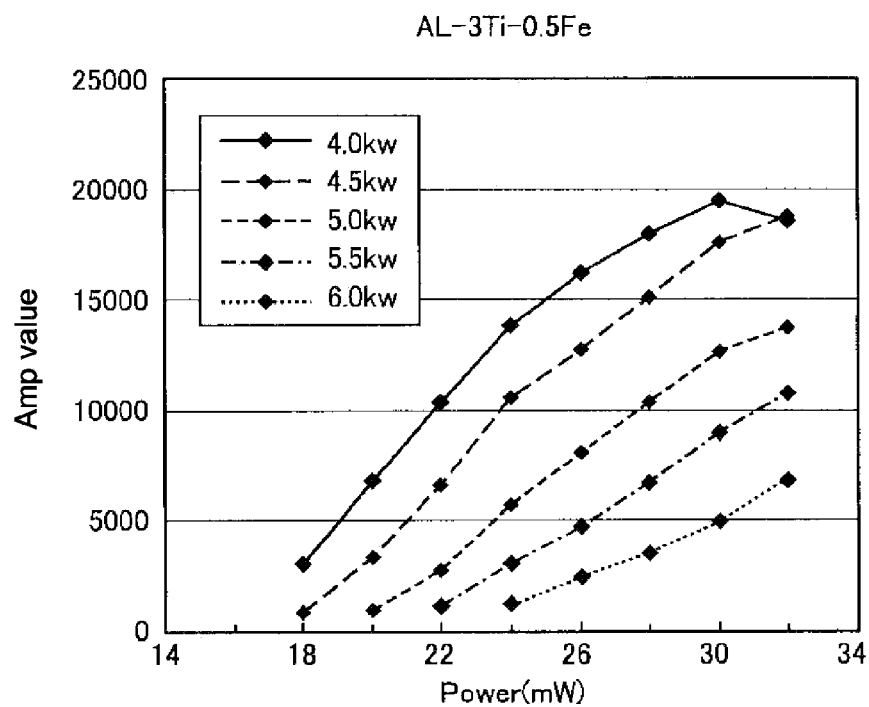
FIG. 12 A diagram showing the initial recording sensitivity of the read-only optical recording medium according to Examples 13 to 17.
Figure 13:
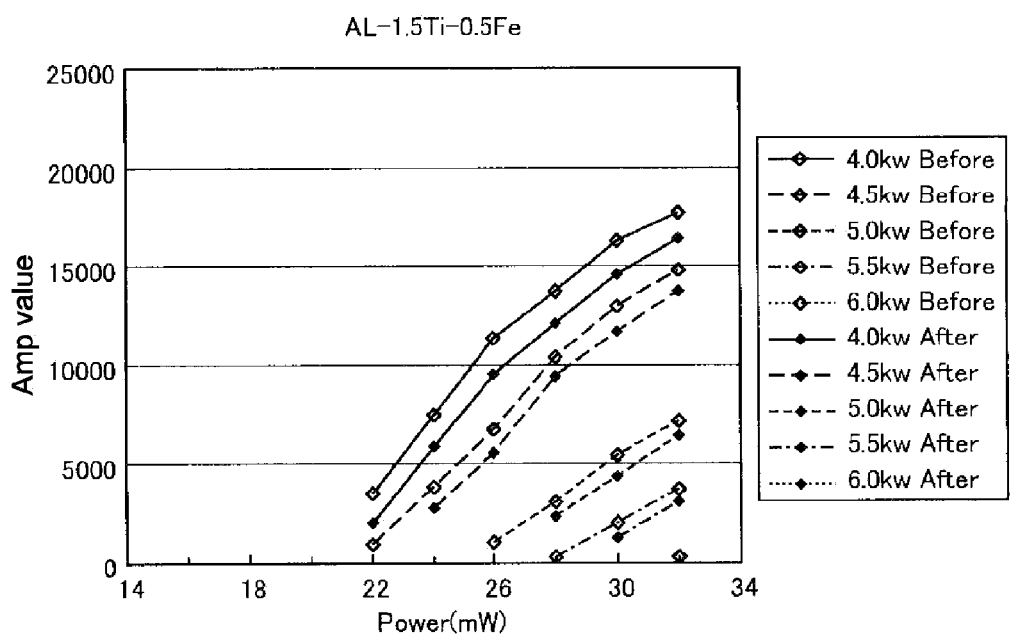
FIG. 13 A diagram showing changes in a sub-data reproduction signal output before and after an acceleration test of the read-only optical recording medium according to Examples 3 to 7.
Figure 14:
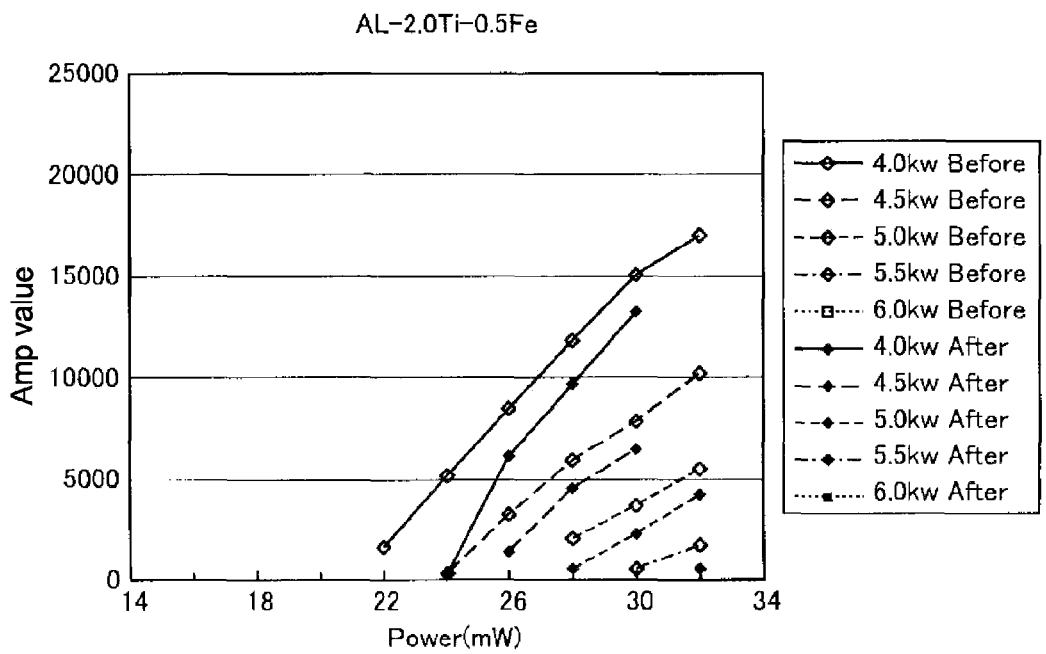
FIG. 14 A diagram showing changes in the sub-data reproduction signal output before and after the acceleration test of the read-only optical recording medium according to Examples 8 to 12.
Figure 15:
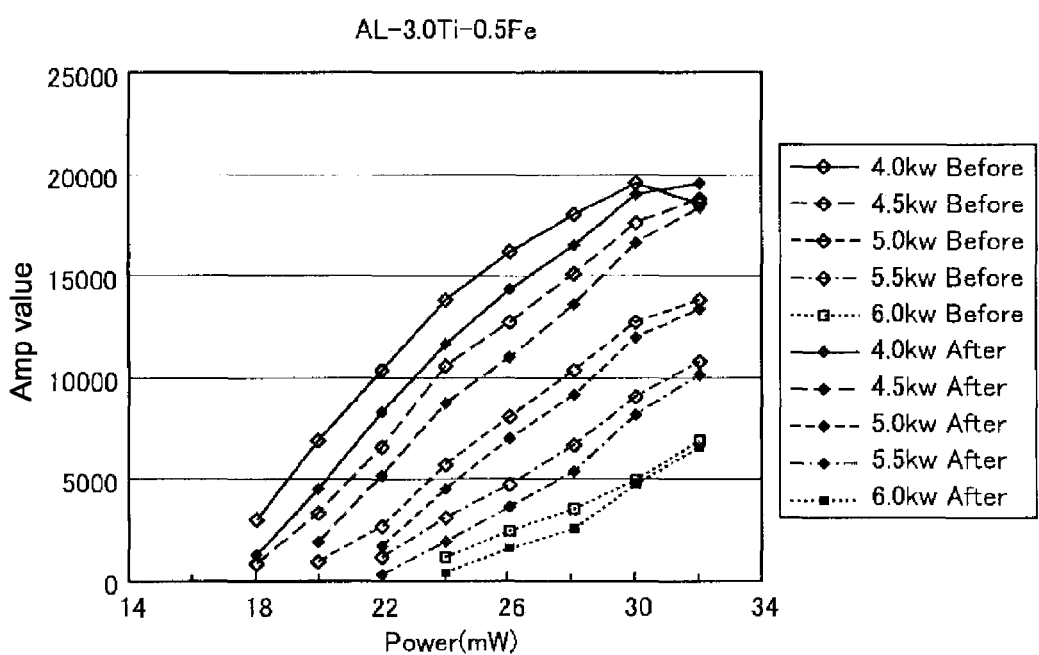
FIG. 15 A diagram showing changes in the sub-data reproduction signal output before and after the acceleration test of the read-only optical recording medium according to Examples 13 to 17.

FIGS. 10 to 12 are diagrams showing Amp values, that is, sub-data reproduction signal outputs with respect to sub-data recording power of the samples of Examples 3 to 17, the diagrams showing recording sensitivities before the acceleration test. In addition, FIGS. 13 to 15 are diagrams showing Amp values, that is, sub-data reproduction signal outputs before and after the acceleration test in accordance with sub-data recorded onto each of the samples of Examples 3 to 17.

It can be seen from the results of FIGS. 10 to 15 that the change in the Amp value before and after the acceleration test is suppressed to 2000 to 3000 or less in all the examples and durability with respect to a temporal change of the sub-data reproduction signal is provided.

Therefore, it can be seen that, by the structure of the read-only optical recording medium according to the present invention as in Examples 3 to 17, temporal changes of the sub-data reproduction signal can be suppressed.

Moreover, it can also be seen that as a content of Ti increases, recording power with which sub-data is recorded decreases, with the result that a recording sensitivity is improved.

It should be noted that when the same measurement is carried out on the samples of Comparative Examples 1 and 2 described above, a change amount of the Amp value due to a temporal change exceeds 5000, and a temporal change of the sub-data reproduction signal outputs becomes large, that is, durability with respect to a temporal change of the sub-data reproduction signal outputs is not provided.

Further, when the same measurement is carried out when using an Ag alloy for the metal reflective film, a change of the Amp value is small, and a temporal change of the sub-data reproduction signal is small. However, in the case of an Ag alloy, the recording sensitivity is smaller and larger power is required than in the case of an Al alloy in the examples of the present invention.

The present invention is not limited to the above embodiments and examples and may be modified without departing from the gist of the present invention.

DESCRIPTION OF REFERENCE NUMERALS 1 reproducing apparatus
2 spindle motor
3 I-V conversion circuit
4 matrix circuit
5 binary circuit
6 host computer
7 network interface
8 PLL circuit
9 synchronization detection circuit
10 address detection circuit
11 A/D converter
12 detection pulse generation portion
13 sub-data detection circuit
14 ECC circuit
15 inversion circuit
50 sub-data recording apparatus
61 sub-data generation circuit
70 management server
100 optical disc
101 substrate
102 metal reflective film
103 cover layer
104 objective lens
105 laser light

The invention claimed is:

1. A read-only optical recording medium, comprising;
a substrate;
an information recording surface on the substrate with pits and lands, the information recording surface operable to record information; and
a metal reflective film in contact with the information recording surface and represented by $Al_{100-x-z}X_xZ_z$, where x and z each represent an atomic %, X is constituted of an element including at least Ti, Z is constituted of an element including at least Fe, x is 1.0 to 3.0, and z is 0.05 to 1.0.

2. The read-only optical recording medium according to claim 1,
wherein,
main data recorded onto the information recording surface includes pits and lands, and
sub-data is recorded onto the metal reflective film by marks formed by irradiating recording laser light onto the metal reflective film.

3. The read-only optical recording medium according to claim 1,
wherein information recorded on the information recording surface is operable to be read out by irradiating light having a wavelength of 405 nm.

4. The read-only optical recording medium according to claim 2,
wherein the recording of the sub-data and readout of the recorded main data and sub-data are performed by irradiating light having a wavelength of 405 nm.

* * * * *